(12) United States Patent
Sasaki

(10) Patent No.: US 9,361,058 B2
(45) Date of Patent: Jun. 7, 2016

(54) IMAGE PROCESSING APPARATUS, INFORMATION PROCESSING APPARATUS AND METHOD FOR DETERMINING WHETHER TARGET IMAGE IS PROCESSABLE AND ACQUIRING PROCESSED TARGET IMAGE FROM THE INFORMATION PROCESSING APPARATUS

(71) Applicant: CANON KABUSHIKI KAISHA, Tokyo (JP)

(72) Inventor: Yuto Sasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/520,201

(22) Filed: Oct. 21, 2014

(65) Prior Publication Data

US 2015/0116767 A1 Apr. 30, 2015

(30) Foreign Application Priority Data

Oct. 25, 2013 (JP) .................................. 2013-222290

(51) Int. Cl.
*G06K 15/02* (2006.01)
*G06F 3/12* (2006.01)
*H04N 1/00* (2006.01)

(52) U.S. Cl.
CPC .............. *G06F 3/1294* (2013.01); *G06F 3/122* (2013.01); *G06F 3/1211* (2013.01); *G06F 3/1244* (2013.01); *G06F 3/1256* (2013.01); *G06F 3/1288* (2013.01); *H04N 1/00244* (2013.01); *H04N 1/00949* (2013.01); *H04N 2201/0094* (2013.01)

(58) Field of Classification Search
None
See application file for complete search history.

(56) References Cited

U.S. PATENT DOCUMENTS

2011/0188063 A1* 8/2011 Nuggehalli et al. ......... 358/1.13

FOREIGN PATENT DOCUMENTS

JP 2011-131382 A 7/2011

OTHER PUBLICATIONS

Machine translation of JP Pub 2011-131382 to Son Nagamatsu.*

* cited by examiner

*Primary Examiner* — Benny Q Tieu
*Assistant Examiner* — Haris Sabah
(74) *Attorney, Agent, or Firm* — Canon USA, Inc. IP Division

(57) ABSTRACT

An image processing apparatus to communicate with an information processing apparatus includes an acquisition unit, first and second determination units, and a transmission control unit. The acquisition unit acquires a target file. The first determination unit determines whether the target file is processable by, and the second determination unit determines whether the target file is stored in, the information processing apparatus. The transmission control unit transmits information to the information processing apparatus. When the target file is not processable by, and is not stored in, the information processing apparatus, the transmission control unit transmits the target file and processing information to the information processing apparatus. In a case where the target file is not processable by, and is stored in, the information processing apparatus, the transmission control unit transmits identification information of the target file and the processing information to the information processing apparatus.

15 Claims, 15 Drawing Sheets

FIG.8

| SERVER MANAGEMENT ID | FILE NAME |
|---|---|
| 1 | Data1.docx |
| 2 | Data2.pdf |
| . . . | . . . |
| 6 | Data6.xlsx |

FIG.12

| SERVER MANAGEMENT ID | FILE NAME | DATA SIZE | DATE AND TIME OF UPDATE | USB SERIAL ID | DEVICE SERIAL ID |
|---|---|---|---|---|---|
| 1 | Data1.docx | 400KB | MAY 10, 2013, 01:00 PM | BBB00001 | ABC00001 |
| 2 | Data2.pdf | 200KB | MAY 10, 2013, 01:11 PM | CCC00022 | — |
| ⋮ | ⋮ | ⋮ | ⋮ | ⋮ | ⋮ |
| 6 | Data6.xlsx | 30KB | MAY 13, 2013, 01:00 PM | BBB00001 | ABC00001 |

IMAGE PROCESSING APPARATUS, INFORMATION PROCESSING APPARATUS AND METHOD FOR DETERMINING WHETHER TARGET IMAGE IS PROCESSABLE AND ACQUIRING PROCESSED TARGET IMAGE FROM THE INFORMATION PROCESSING APPARATUS

BACKGROUND OF THE INVENTION

1. Field of the Invention

The present invention relates to an image processing apparatus, an information processing apparatus, a data processing method for the image processing apparatus, a data processing method for the information processing apparatus, and a storage medium.

2. Description of the Related Art

Japanese Patent Application Laid-Open No. 2011-131382 discusses a technique in which an image processing apparatus transmits a print target file to a server, and the server converts the received print target file into print data interpretable by the image processing apparatus, and returns the resultant print data to the image processing apparatus. However, the technique discussed in Japanese Patent Application Laid-Open No. 2011-131382 does not take into consideration the increase in efficiency of transmission processing when requesting an image processing server to perform processing. Therefore, for example, the image processing apparatus may perform useless transmission processing, such as retransmission of the same image file to the image processing server. There has been a possibility that this situation may cause a problem of congested network circuit or a problem of slowed printing and preview display because of prolonged file transmission time.

SUMMARY OF THE INVENTION

According to a second aspect of the present invention, an image processing apparatus capable of communicating with an information processing apparatus includes an acquisition unit configured to acquire a processing target file to be printed, a first determination unit configured to determine whether the acquired processing target file is processable by the image processing apparatus, a second determination unit configured to determine whether the processing target file is stored in the information processing apparatus, and a transmission control unit configured to transmit information to the information processing apparatus, wherein, in a case where the first determination unit has determined that the processing target file is not processable by, and the second determination unit determines that the processing target file is not stored in, the information processing apparatus, the transmission control unit transmits the processing target file and processing information to the information processing apparatus, and wherein, in a case where the first determination unit has determined that the processing target file is not processable by, and the second determination unit has determined that the processing target file is stored in, the information processing apparatus, the transmission control unit transmits identification information of the processing target file and the processing information to the information processing apparatus.

Further features of the present invention will become apparent from the following description of exemplary embodiments with reference to the attached drawings.

BRIEF DESCRIPTION OF THE DRAWINGS

FIG. 8 illustrates a server file management table managed in the server apparatus.

FIG. 12 illustrates an example file management table.

DESCRIPTION OF THE EMBODIMENTS

Various exemplary embodiments, features, and aspects of the invention will be described in detail below with reference to the drawings.

<Description of System Configuration>

Figure 1:
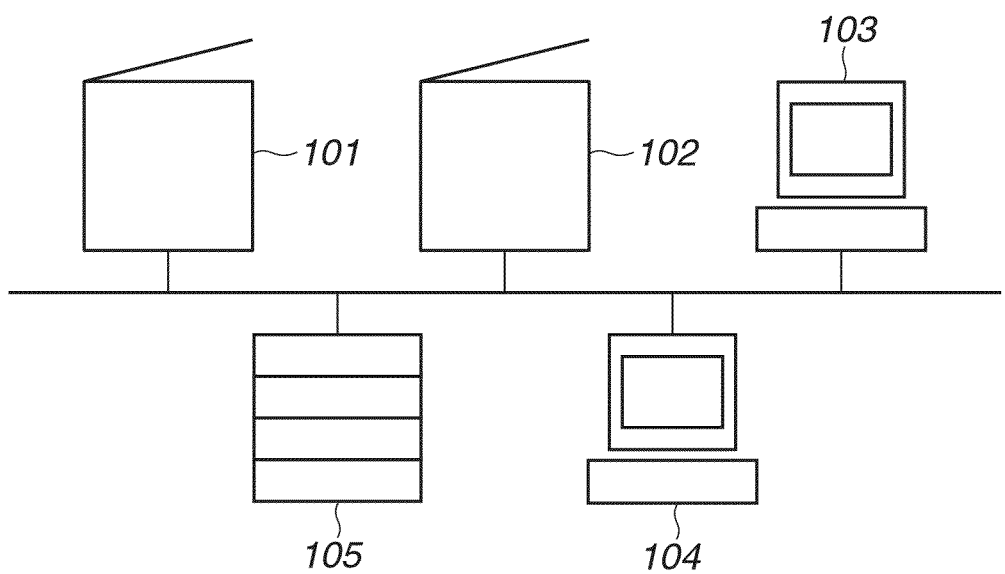
FIG. 1 illustrates a configuration of an image processing system.

FIG. 1 illustrates a configuration of an image processing system according to a first exemplary embodiment. The image processing system according to the present exemplary embodiment includes a plurality of image processing apparatuses including image processing apparatuses 101 and 102, information processing terminals 103 and 104, and an image processing server 105 serving as an information processing apparatus. These apparatuses are communicably connected with each other via a network. The image processing apparatus 101 will be described below as a representative of image processing apparatuses. The above-described network may be based on any communication protocol, such as a local area network (LAN) and the Internet, as long as the apparatuses within the image processing system can communicate with each other.

Referring to FIG. 1, the image processing apparatus 101 is capable of receiving an image data print request from an information processing terminal, printing an image, reading an image via a scanner provided on the apparatus, and printing the read image. In addition, the image processing apparatus 101 is capable of displaying to a user contents of a server message block (SMB) shared folder in an information processing terminal or contents of a universal serial bus (USB) memory connected to the image processing apparatus 101, and printing a file selected from the contents by the user. The image processing apparatus 101 is further capable of requesting the image processing server 105 to perform image processing which the image processing apparatus 101 itself cannot perform.

The image processing server 105 receives processing content instruction data and processing target data from an image processing apparatus, and performs processing on the processing target data based on the processing content instruction data. As a result, the image processing server 105 returns the generated output data (for example, page description language (PDL) data and preview data) to the requester image processing apparatus. The processing content instruction data may be simply referred to as processing content or setting information. A type (for example, preview and printing), a document format, a format after processing, resolution, an output size, etc. are described in the processing content instruction data. When the image processing apparatus 101 requests image processing on a thread basis, it is performed in unit of thread. For example, when a preview display button is pressed and then a first thread of the image processing apparatus 101 transmits the processing content instruction data and the processing target data to the image processing server 105, output data generated by the image processing server 105 is returned to the first thread. Since the first thread issues a processing request to perform preview display, the received output data can be recognized as the output data for preview image.

Figure 2:
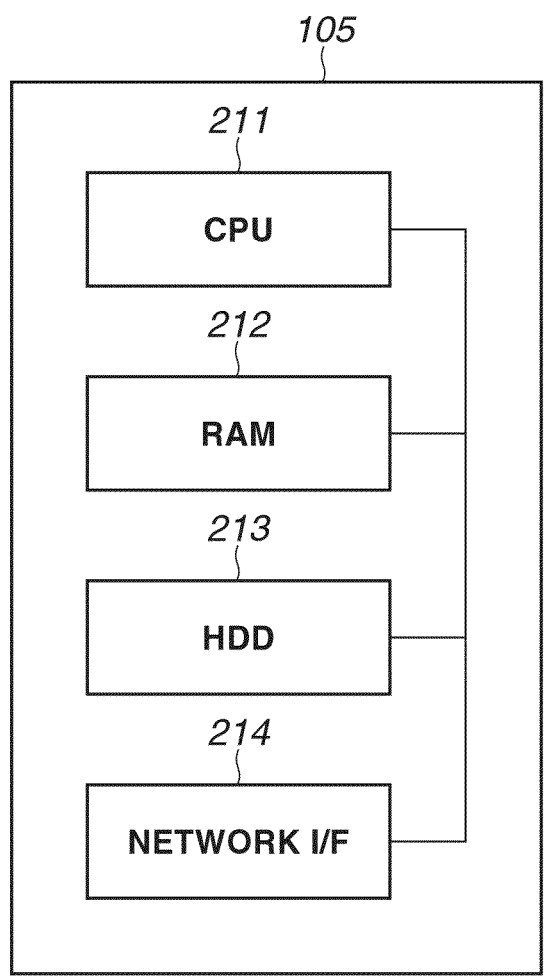
FIG. 2 is a block diagram illustrating an example configuration of an image processing server.

FIG. 2 is a block diagram illustrating an example configuration of the image processing server 105 illustrated in FIG. 1.

Referring to FIG. 2, the image processing server 105 includes a central processing unit (CPU) 211, a random access memory (RAM) 212, a hard disk drive (HDD) 213, and a network interface (I/F) 214. The CPU 211 controls the entire apparatus and can control data transmission and reception to/from the RAM 212, the HDD 213, and the network I/F 214. Further, the CPU 211 loads a control program (instructions) from the HDD 213 into the RAM 212, and executes the instructions stored in the RAM 212.

The control program (instructions) for implementing image processing executable by the CPU 211 is stored in the HDD 213. An example of the image processing includes preview file generation and print file generation. In addition, information about file formats processable by the image processing server 105, and data received from an image processing apparatus, such as processing content instruction data and processing target data, can be appropriately stored in the HDD 213.

The RAM 212 stores instructions loaded from the HDD 213. The CPU 211 can read instructions from the RAM 212. Various types of data required to execute instructions can be stored in the RAM 212.

The network I/F 214 allows the image processing server 105 to perform network communication with apparatuses within the image formation system. The network I/F 214 notifies the CPU 211 of data reception, and transmits data in the RAM 212 to the network.

Figure 3:
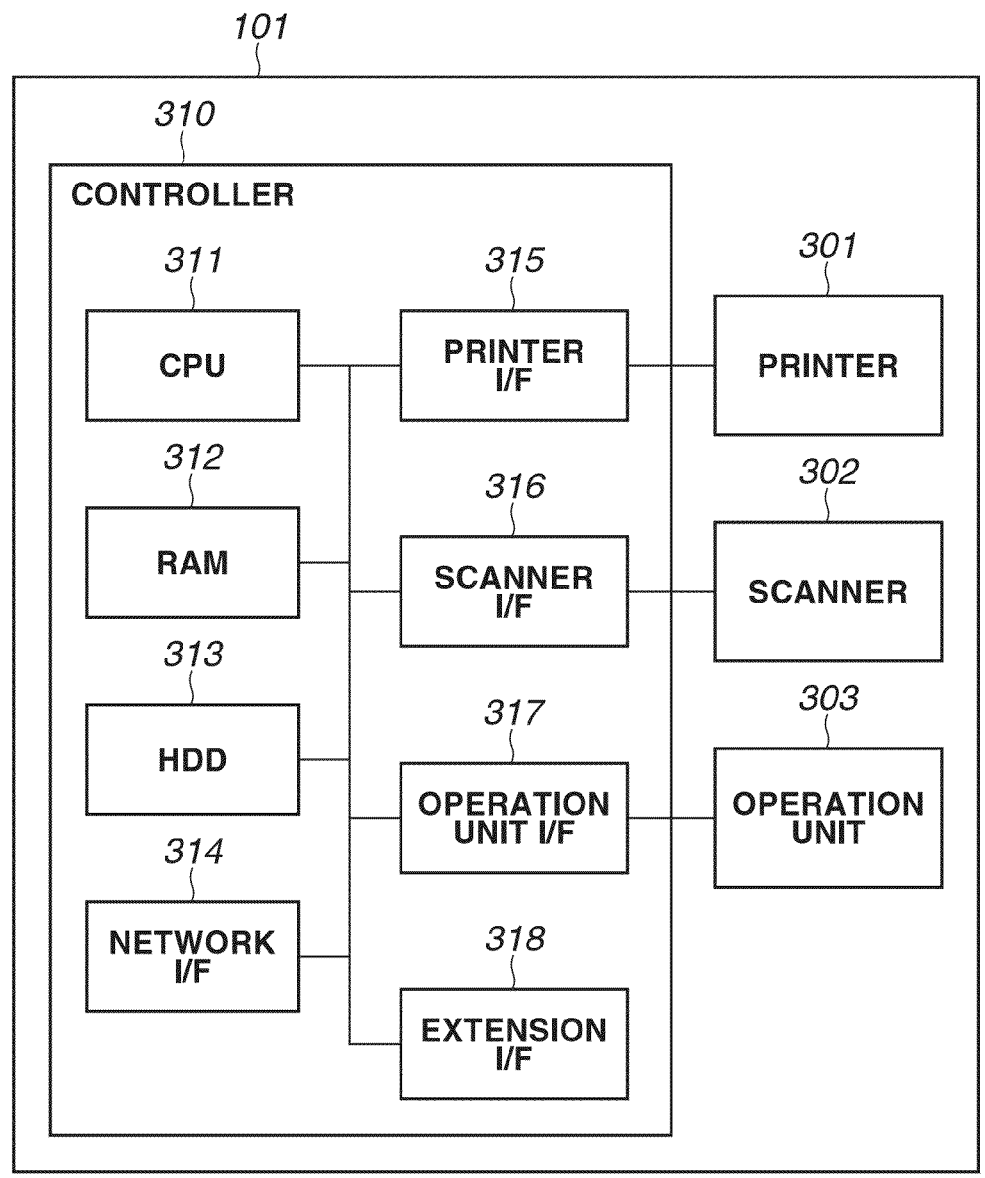
FIG. 3 is a block diagram illustrating a configuration of the image processing apparatus illustrated in FIG. 1.

FIG. 3 is a block diagram illustrating a configuration of the image processing apparatus 101 illustrated in FIG. 1.

Referring to FIG. 3, the image processing apparatus 101 includes a controller 310, a printer 301, a scanner 302, and an operation unit 303. The controller 310 includes a CPU 311, a RAM 312, a HDD 313, a network I/F 314, a printer I/F 315, a scanner I/F 316, an operation unit I/F 317, and an extension I/F 318. The CPU 311 can transmit and receive data to/from the RAM 312, the HDD 313, the network I/F 314, the printer I/F 315, the scanner I/F 316, and the operation unit I/F 317. Further, the CPU 311 loads instructions from the HDD 313 into the RAM 312, and executes the instructions stored in the RAM 312.

The HDD 313 can store instructions executable by the CPU 311, setting values to be used by apparatuses, and data related to processing requested by the user. The RAM 312 stores instructions loaded from the HDD 313. The CPU 311 can read instructions from the RAM 312. Various types of data required to execute instructions can be stored in the RAM 312.

The network I/F 314 allows the image processing apparatus 110 to perform network communication with apparatuses within the image formation system. The network I/F 314 notifies the CPU 311 of data reception, and transmits data in the RAM 312 to the network. The printer I/F 315 transmits image data transmitted from the CPU 311 to the printer 301, and transmits a printer status received from the printer 301 to the CPU 311.

The scanner I/F 316 transmits an image read instruction received from the CPU 311 to the scanner 302, transmits image data received from the scanner 302 to the CPU 311, and transmits a status received from the scanner 302 to the CPU 311. The operation unit I/F 317 transmits a user instruction input from the operation unit 303 to the CPU 311, and transmits screen information for allowing user operation to the operation unit 303. The printer 301 prints image data received from the printer I/F 315 on paper, and transmits a printer status to the printer I/F 315.

The scanner 302 reads a document sheet placed on the scanner according to an image read instruction received from the scanner I/F 316, transmits digitized image data to the scanner I/F 316, and transmits a scanner status to the scanner I/F 316.

The operation unit 303 allows the user to operate the image processing apparatus 101. For example, the operation unit 303 includes a liquid crystal display (LCD) for providing the user with an operation screen and receiving an operation from the user.

The extension I/F 318 enables connecting an external apparatus to the image processing apparatus 101. For example, the extension I/F 318 is provided with a USB-format interface, and capable of writing and reading data to/from a connected external apparatus, such as a USB memory.

Figure 4:
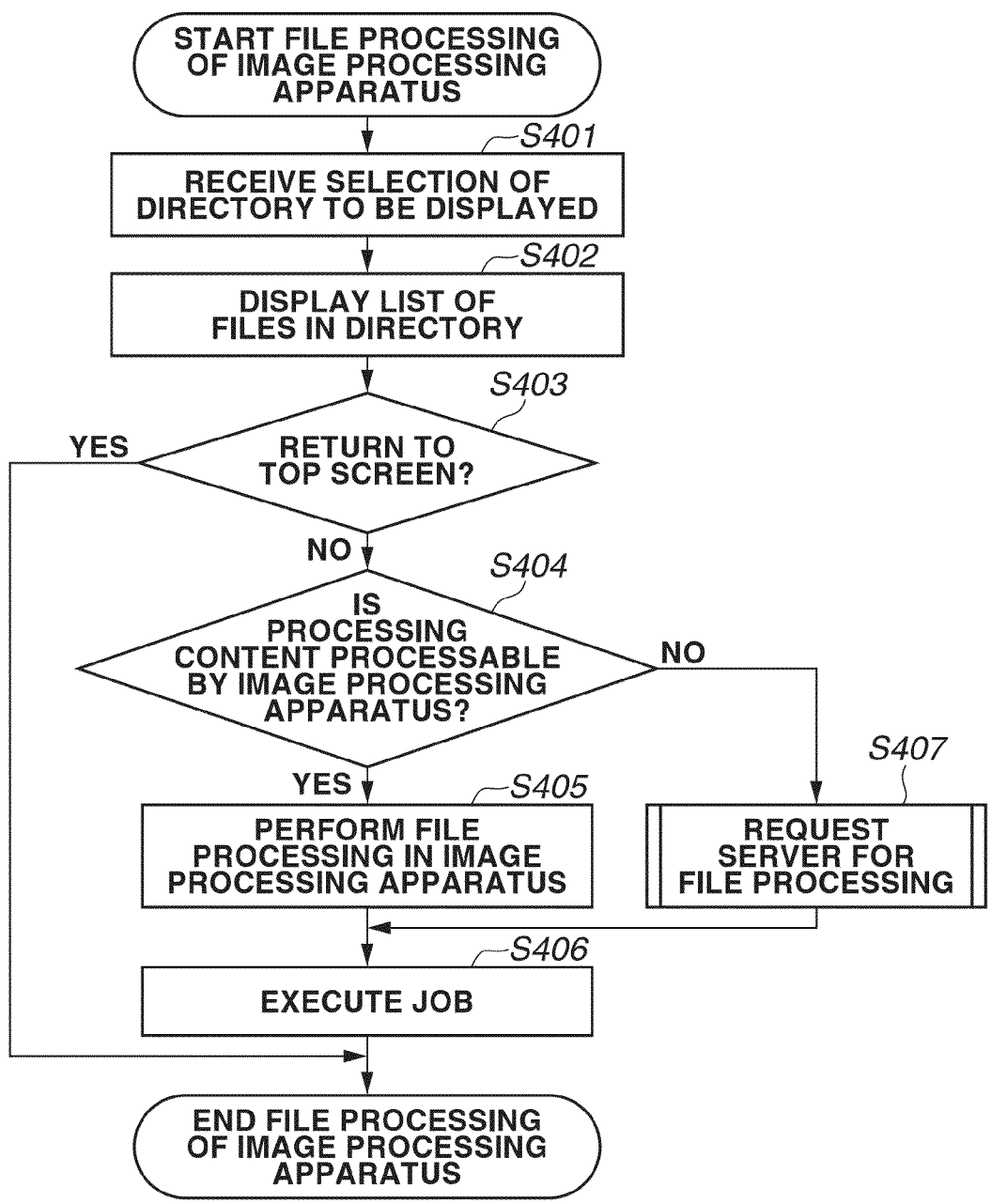
FIG. 4 is a flowchart illustrating a data processing method of the image processing apparatus.

FIG. 4 is a flowchart illustrating a data processing method of the image processing apparatus 101 according to the present exemplary embodiment. In the present exemplary embodiment, when the user selects a file in a specific directory by using the operation unit 303 of the image processing apparatus 101 and then performs printing, the image processing apparatus 101 and the image processing server 105 perform relevant processing. Each step of flowcharts executed by the image processing apparatus 101 according to the present specification is implemented when the CPU 311 executes instructions based on various information stored in the HDD 313 and information received via the network I/F 314.

In step S401, via the operation unit 303, the image processing apparatus 101 receives from the user a selected directory where the target file is stored. Although selection target directories include, for example, an existing SMB shared folder in the information processing terminal 103 and a USB memory connected to the image processing apparatus 101, selection target directories are not limited thereto. Any locations accessible from the image processing apparatus 101 can be selected.

In step S402, the image processing apparatus 101 displays as a file selection screen the contents of the directory selected from the operation unit 303 in step S401.

Figure 5:
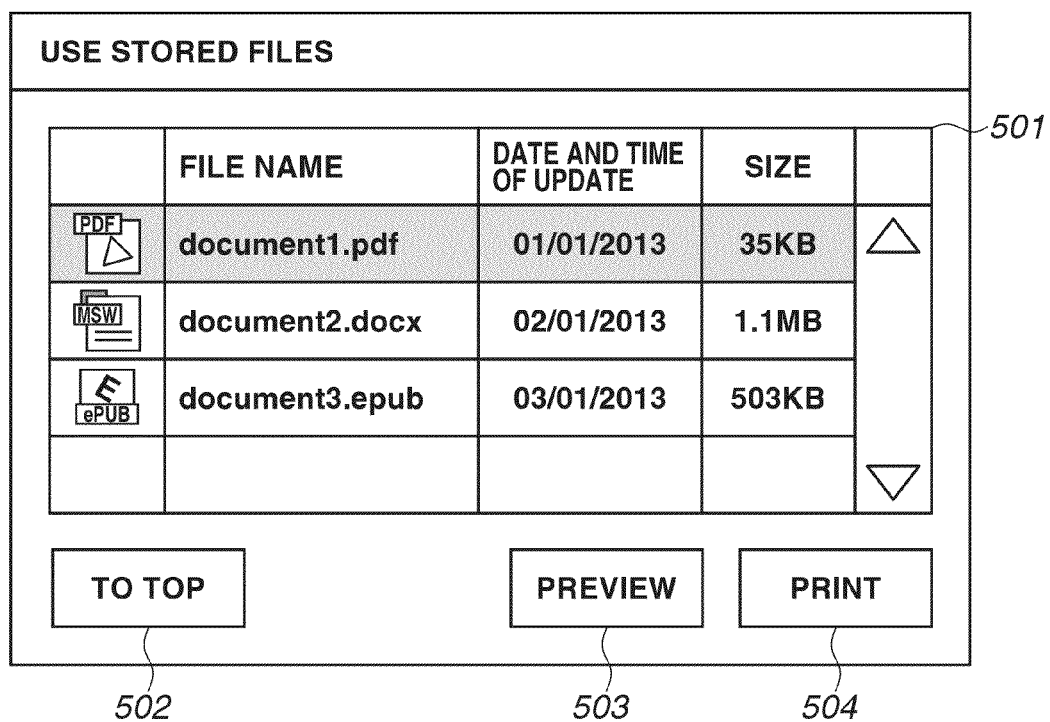
FIG. 5 illustrates an example user interface (UI) screen displayed on an operation unit.

FIG. 5 illustrates an example UI screen displayed on the operation unit 303 illustrated in FIG. 3. This example file selection screen is displayed on the operation unit 303 by the image processing apparatus 101. The file selection screen is used by the user to select a target file from a desired directory in step S402. The file selection screen includes a file list display area 501, a top screen display (TO TOP) button 502, a preview display (PREVIEW) button 503, and a PRINT button 504.

In step S403, the image processing apparatus 101 receives a selection by the user in the file selection screen displayed in step S402. When the user presses the "TO TOP" button 502 (YES in step S403), the image processing apparatus 101 changes the screen from the file selection screen to the top screen. Then, the processing of the flowchart is terminated.

When the user selects a processing target file and presses the PREVIEW button 503 or the PRINT button 504 (NO in step S403), the processing proceeds to step S404. In step S404, the image processing apparatus 101 determines whether it can perform processing on the target file.

When the image processing apparatus 101 determines that it can perform processing on the target file by itself (YES in step S404), the processing proceeds to step S405. In step S405, the image processing apparatus 101 converts the target file into a file having the format after processing. The processing refers to image processing for generating a preview file and a print file. In step S406, the image processing apparatus 101 executes a job by using a file having the format after processing (also simply referred to as output data). Then, the processing of the flowchart is terminated. A job in this case refers to displaying a preview screen when the PREVIEW button 503 is pressed, and refers to printing when the PRINT button 504 is pressed.

On the other hand, when the image processing apparatus 101 determines that it cannot perform processing on the target file by itself (NO in step S404), the processing proceeds to step S407. In step S407, the image processing apparatus 101 requests the image processing server 105 to perform the relevant processing. In step S406, the image processing apparatus 101 executes a job by using the processed data. Then, the processing of the flowchart is terminated.

Figure 6:
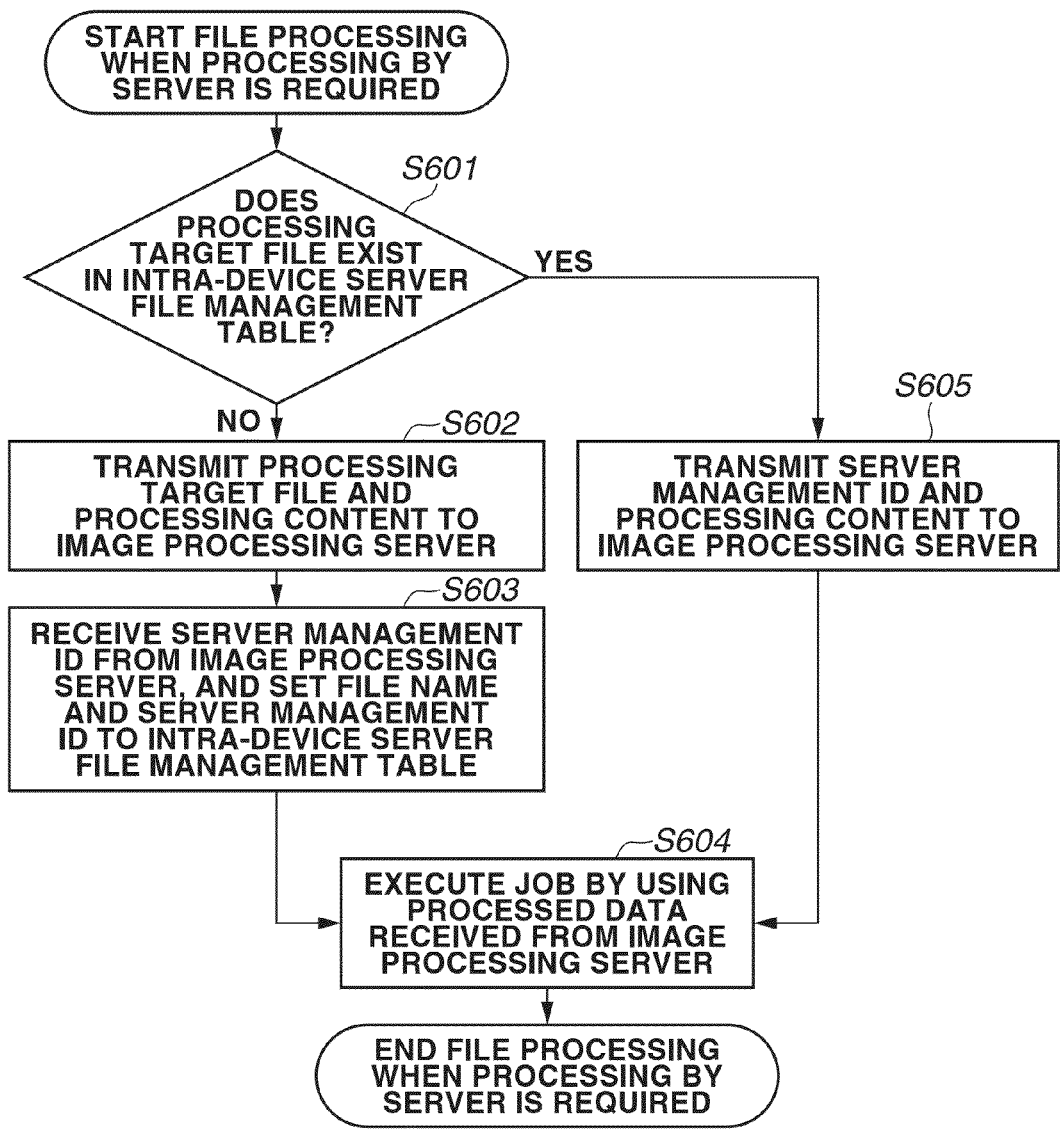
FIG. 6 is a flowchart illustrating a data processing method of the image processing apparatus.

FIG. 6 is a flowchart illustrating a data processing method of the image processing apparatus according to the present exemplary embodiment. When the image processing apparatus 101 determines that it cannot perform processing on the target file by itself in step S404 illustrated in FIG. 4, the image processing apparatus 101 performs this example internal processing in step S407 to request the image processing server 105 to perform the relevant processing.

Figure 7:
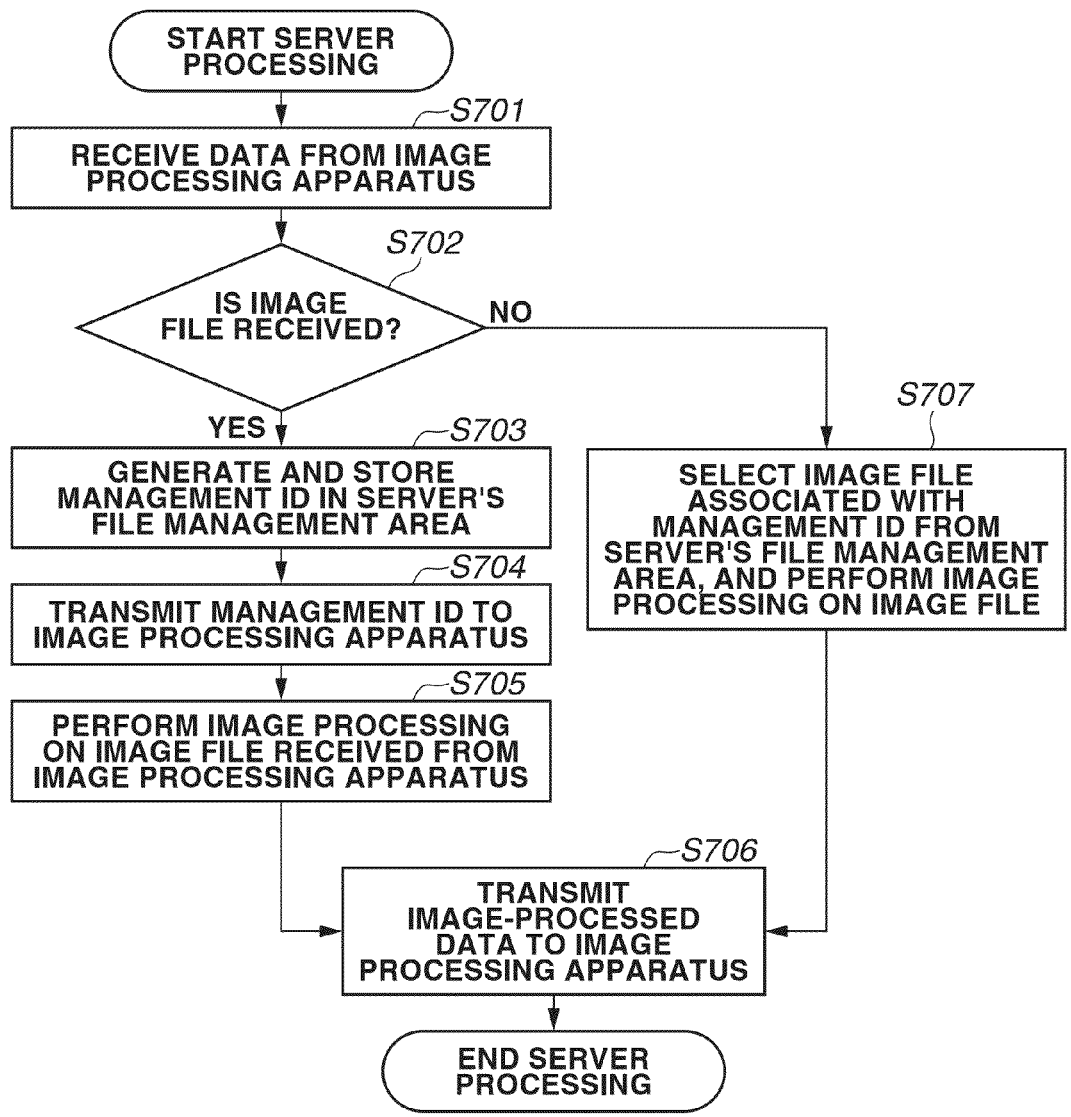
FIG. 7 is a flowchart illustrating a data processing method of a server apparatus.

FIG. 7 is a flowchart illustrating a data processing method of a server apparatus according to the present exemplary embodiment. The image processing server 105 performs this example processing upon reception of data from the image processing apparatus 101. Each step of flowcharts executed by the image processing server 105 according to the present exemplary embodiment is implemented when the CPU 211 of the image processing server 105 executes a control program stored in the HDD 213. To describe the processing flow of the entire image processing system according to the present exemplary embodiment, an example of control for processing target file transmission will be described below with reference to the flowcharts illustrated in FIGS. 6 and 7. Specifically, to perform control for processing target file transmission, the image processing apparatus 101 determines whether it can perform print processing on the acquired processing target file, and determines whether the relevant processing target file is stored in the server apparatus.

In step S601, the image processing apparatus 101 determines whether a processing target file exists in a server file management table 801 managed in the image processing apparatus 101.

Figure 8:
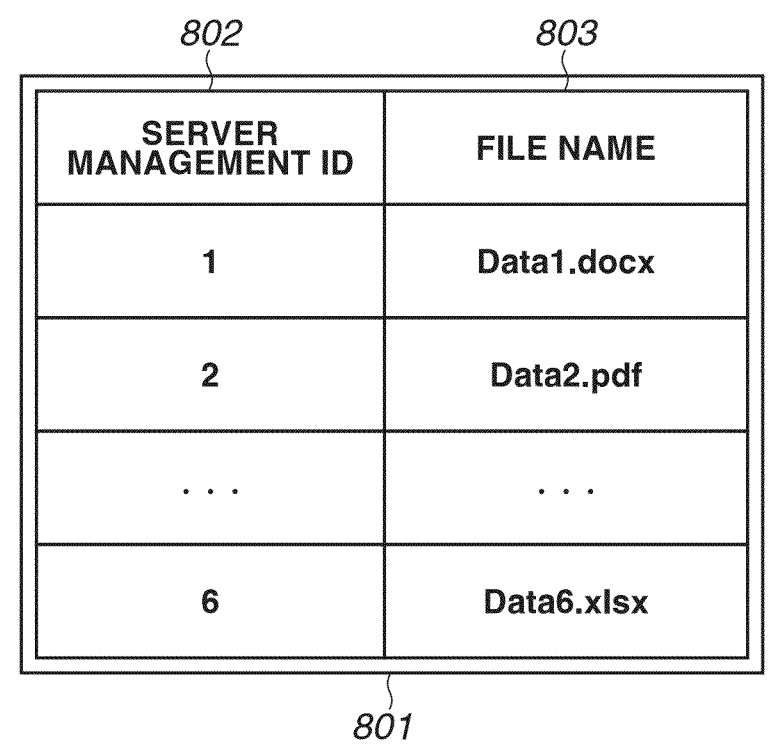

FIG. 8 illustrates the server file management table 801 managed in the image processing apparatus 101 and stored in the HDD 313 of the image processing apparatus 101 illustrated in FIG. 1. The server file management table 801 associates identification information for identifying an information processing apparatus (the image processing server 105) which has processed the processing target file with specification information for specifying the processing target file. The specification information may be any information for specifying a storage destination in which the image processing server 105 stores the processing target file.

Referring to FIG. 8, the server file management table 801 managed in the image processing apparatus 101 includes the following management data. Specifically, the server file management table 801 includes a file name 803 of an image file stored in a file management area in the HDD 213 and a server management identifier (ID) 802 used by the image processing server 105 to access the file. The server management ID 802 enables uniquely specifying data existing in the file management area in the HDD 213 of the image processing server 105, and may be a uniform resource identifier (URI) for accessing a file.

When the image processing apparatus 101 determines that the processing target file does not exist in the server file management table 801 managed in the image processing apparatus 101 (NO in step S601), the processing proceeds to step S602. In step S602, the image processing apparatus 101 transmits the processing target file and the processing content to the image processing server 105.

In step S701, the image processing server 105 receives the data from the image processing apparatus 101. In step S702, the image processing server 105 determines the type of the data received together with the processing content. When the PREVIEW button 503 is pressed, the processing content describes "preview" as the type. When the PRINT button 504 is pressed, the processing content describes "print" as the type. When the type of the data is determined to be an image file (YES in step S702), the processing proceeds to step S703. In step S703, the image processing server 105 generates a server management ID for the target image file, and stores the server management ID and the target image file in the file management area in the HDD 213. In step S704, the image processing server 105 transmits the server management ID to the image processing apparatus 101.

In step S603, the image processing apparatus 101 receives the server management ID from the image processing server 105, and describes the file name 803 and the server management ID 802 in the server file management table 801 managed in the image processing apparatus 101.

In step S705, the image processing server 105 performs image processing on the image file received from the image processing apparatus 101, based on the processing content received at the same timing as the image file. In step S706, the image processing server 105 transmits the output data obtained in the image processing in step S705 to the image processing apparatus 101. Then, the processing of the flowchart is terminated.

In step S604, the image processing apparatus 101 receives the output data, and executes a job. Then, the processing of the flowchart is terminated.

On the other hand, when the image processing apparatus 101 determines that the processing target file exists in the server file management table 801 (YES in step S601), the processing proceeds to step S605. In step S605, the image processing apparatus 101 transmits the server management ID 802 associated with the file name 803 of the target file and the processing content to the image processing server 105.

In step S701, the image processing server 105 receives the data from the image processing apparatus 101. In step S702, the image processing server 105 determines the type of the data received together with the processing content. When the type of the data received is determined to be the server management ID (NO in step S702), the processing proceeds to step S707. In step S707, the image processing server 105 selects the image file associated with the server management ID from the file management area in the HDD 213, and performs image processing on the image file. In step S706, the image processing server 105 transmits the output data obtained through the image processing in step S707 to the image processing apparatus 101. In step S604, the image processing apparatus 101 receives the output data transmitted in step S706, and executes a job. Then, the processing exits this flowchart.

Figure 9:
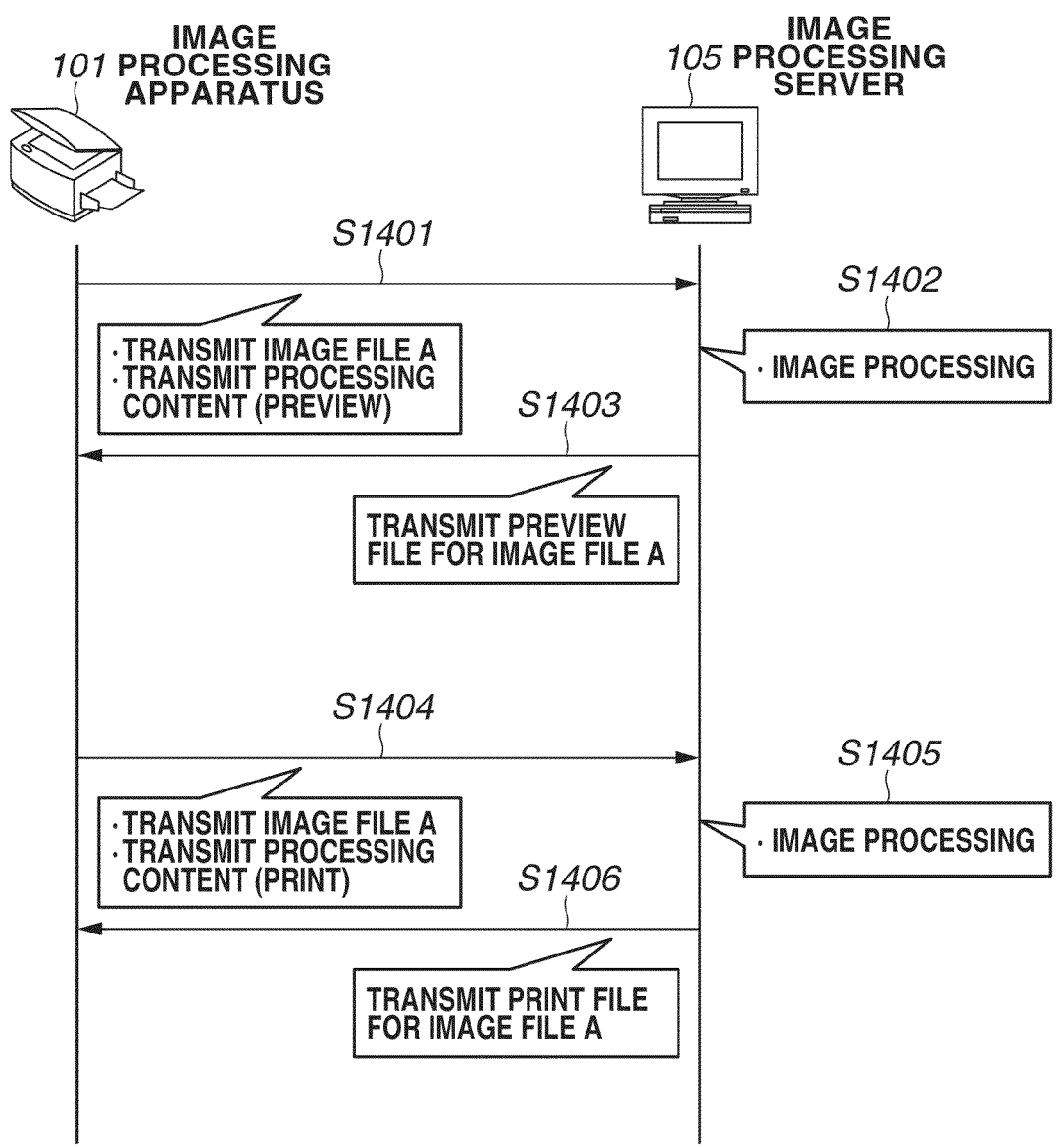
FIG. 9 illustrates an example of specific processing of a conventional image processing system.
Figure 10:
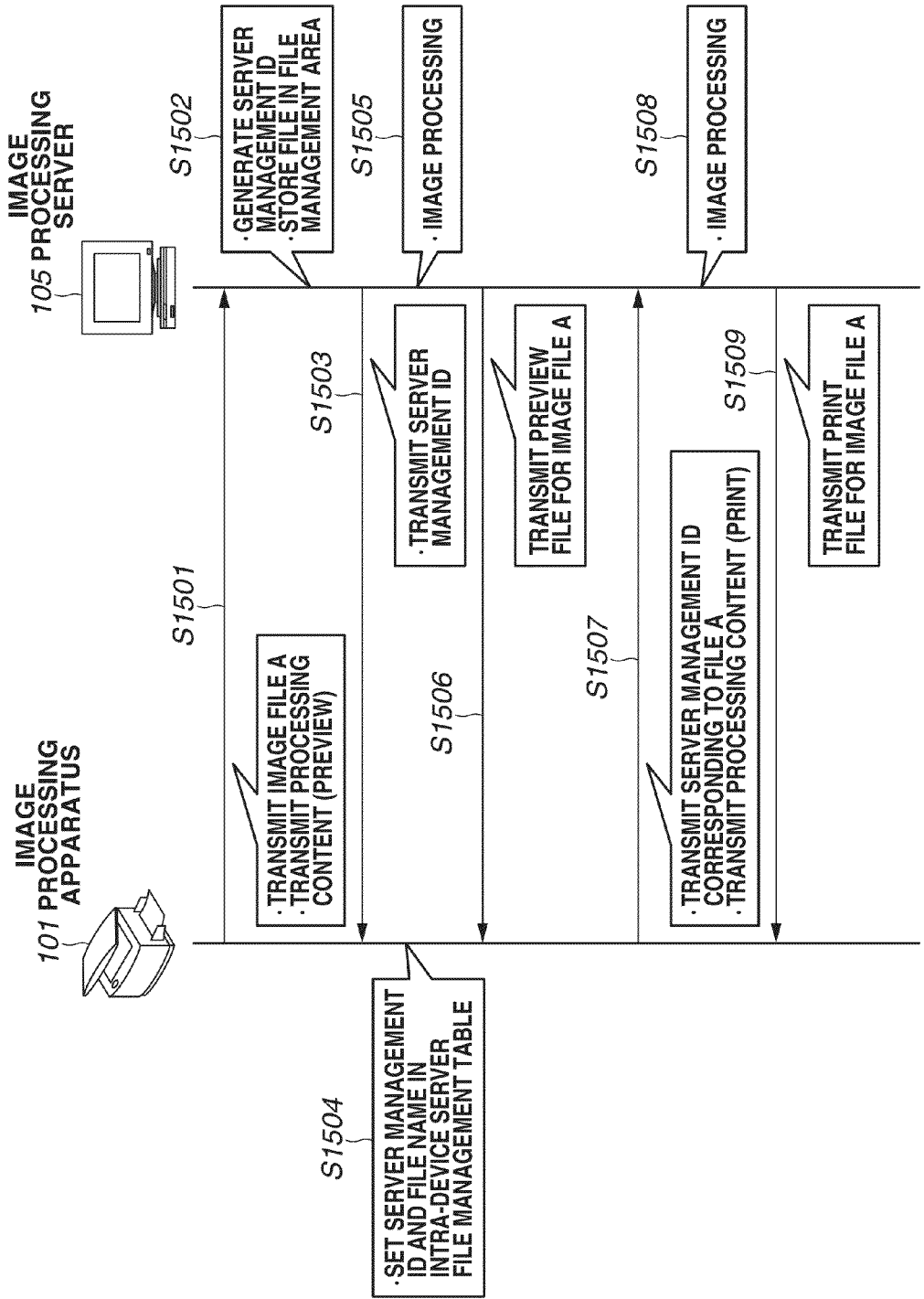
FIG. 10 illustrates an example of specific processing of the image processing system according to an exemplary embodiment.

FIG. 9 illustrates an example of processing of a conventional image processing system using the image processing server 105. FIG. 10 illustrates an example of specific processing of the image processing system using the image processing server 105 according to the present exemplary embodiment. Specific differences between the image processing systems illustrated in FIGS. 9 and 10 will be described below. This specific example uses a job for previewing an image file A and then printing the image file A.

First of all, processing illustrated in FIG. 9 will be described below. In step S1401, the image processing apparatus 101 transmits the image file A and a processing content describing preview processing to the image processing server 105. In step S1402, the image processing server 105 receives these pieces of data and then performs image processing on the image file A to generate a preview image. In step S1403, the image processing server 105 transmits a processed preview file to the image processing apparatus 101. Then, the image processing apparatus 101 displays the received preview file on the operation unit 303. In step S1404, when the user selects the image file A by using the file selection screen illustrated in FIG. 5 and then presses the PRINT button 504, the image processing apparatus 101 transmits the image file A and the processing content describing print data processing. In step S1405, the image processing server 105 receives the image file A and the processing content, and then performs image processing. In step S1406, the image processing server 105 transmits a processed print file to the image processing apparatus 101. Then, the image processing apparatus 101 performs printing by using the received print file. In the example illustrated in FIG. 9, each time the image processing apparatus 101 requests the image processing server 105 for processing, the image processing apparatus 101 needs to transmit an image file to the image processing server 105.

The flowchart illustrated in FIG. 10 will be described below. In step S1501, the image processing apparatus 101 transmits the image file A and the processing content describing preview processing to the image processing server 105. In step S1502, the image processing server 105 generates a server management ID, associates the server management ID with the image file A, and stores the server management ID and the image file A in the file management area in the HDD 213. In step S1503, the image processing server 105 transmits the server management ID of the stored image file A to the image processing apparatus 101. In step S1504, the image processing apparatus 101 describes the server management ID 802 and the file name 803 in the server file management table 801 managed in the image processing apparatus 101. In step S1505, the image processing server 105 performs image processing on the image file to generate a preview file. In step S1506, the image processing server 105 transmits the preview file to the image processing apparatus 101. The image processing apparatus 101 displays the received preview file on the operation unit 303. Then, when the user selects the image file A by using the file selection screen illustrated in FIG. 5 and then selects the PRINT button 504, the image processing apparatus 101 determines whether the image file A exists in the server file management table 801 managed in the image processing apparatus 101. In step S1507, when the image file A is determined to exist in the server file management table 801, the image processing apparatus 101 transmits the server management ID corresponding to the image file A and the processing content describing print processing to the image processing server 105. In step S1508, upon reception of these pieces of data, the image processing server 105 searches for an image file associated with the server management ID in the file management area in the HDD 213, and performs image processing on the searched image file to generate a print file. In step S1509, the image processing server 105 transmits a print file generated in step S1508 to the image processing apparatus 101. The image processing apparatus 101 receives the print file and prints the print file.

According to the present exemplary embodiment, the load of image file transmission can be reduced when performing processing in subsequent stages.

In the first exemplary embodiment, in step S407 illustrated in FIG. 4, the image processing apparatus 101 determines whether a target image file exists in the image processing server 105 by using the server file management table 801 of the image processing apparatus 101.

Meanwhile, the image processing apparatus 101 may be configured not to have the server file management table 801. Specifically, the present invention can be achieved based on a configuration in which the image processing server 105 itself has the file management table 1001, and the image processing apparatus 101 inquires about the existence of the target file each time. The exemplary embodiment will be described below.

Figure 11:
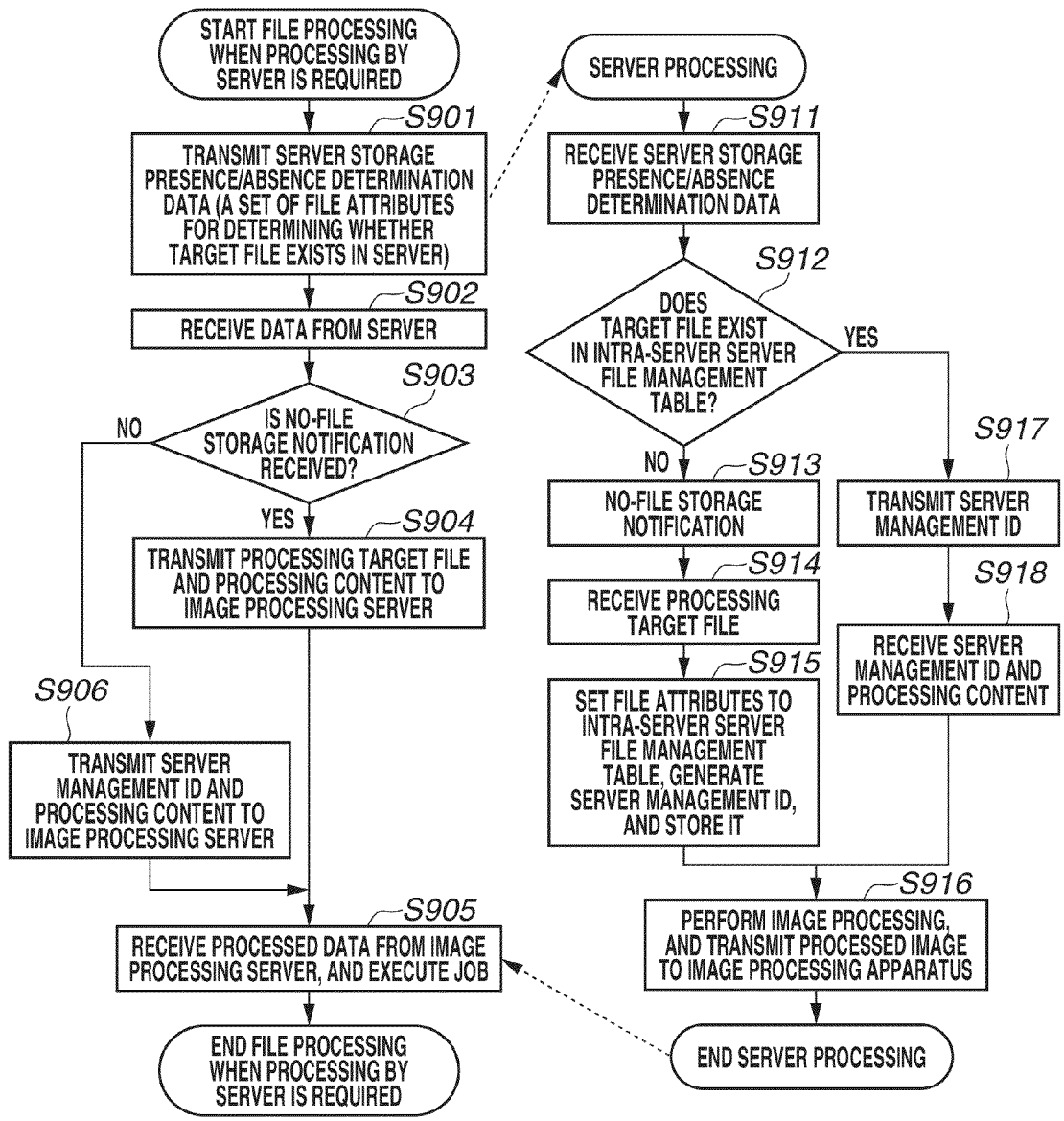
FIG. 11 is a flowchart illustrating a data processing method of the image processing system.

FIG. 11 is a flowchart illustrating a data processing method of the image processing system according to the present exemplary embodiment.

FIG. 12 illustrates an example of the file management table 1001 stored in the HDD 213 of the image processing server 105 illustrated in FIG. 1. Hereinafter, the file management table 1001 managed in the image processing server 105 is simply referred to as a server file management table 1001 managed in the server.

In step S901, when requesting the image processing server 105 to perform image processing in step S407, the image processing apparatus 101 inquires about whether a target file exists in the file management area in the HDD 213 to the image processing server 105. In this case, the image processing apparatus 101 transmits server storage presence/absence determination data to the image processing server 105 to instruct it to determine whether the target file exists. The server storage presence/absence determination data refers to data items for uniquely identifying the target file existing in the file management area in the HDD 213 of the image processing server 105, such as the file name, the file size, the date and time of update, the serial ID of the image processing apparatus 101, and the USB serial ID (for a USB-based job).

In step S911, the image processing server 105 receives the server storage presence/absence determination data from the image processing apparatus 101. In step S912, referring to the server file management table 1001 managed in the server, the image processing server 105 determines whether the target file exists. Attributes for identifying a file are set to the server file management table 1001 managed in the server. For example, the attributes include, for example, a management ID 1002, a file name 1003, a data size 1004, and date and time of file update 1005 assigned to each file of the server. The attributes further include a USB serial ID 1006 (for a USB-based job) and a serial ID 1007 of the image processing apparatus 101.

When the image processing server 105 determines that the target file does not exist in the file management table 1001 (NO in step S912), the processing proceeds to step S913. In step S913, the image processing server 105 issues a no-file storage notification to the image processing apparatus 101. When the image processing apparatus 101 receives the no-file storage notification from the image processing server 105 (YES in step S903), the processing proceeds to step S904. In step S904, the image processing apparatus 101 transmits the target file and the processing content to the image processing server 105.

In step S914, the image processing server 105 receives the target file and the processing content. In step S915, the image processing server 105 sets the file attributes to the server file management table 1001 of the image processing server 105, generates a server management ID, and stores the server management ID and the received file in the file management area in the HDD 213.

In step S916, the image processing server 105 performs image processing on the target file based on the received processing content, and transmits output data to the image processing apparatus 101. In step S905, the image processing apparatus 101 receives the processed output data, and executes a job. Then, the processing of the flowchart is terminated.

On the other hand, when the image processing server 105 determines that the target file exists in server file management table 1001 (YES in step S912), the processing proceeds to step S917. In step S917, the image processing server 105 transmits the server management ID for accessing each file to the image processing apparatus 101. In step S906, the image processing apparatus 101 transmits the received server management ID and the processing content to the image processing server 105. In step S918, the image processing server 105 receives the server management ID and the processing content. In step S916, the image processing server 105 performs image processing on the target file specified by server management ID based on the processing content, and transmits the processed output data to the image processing apparatus 101. In step S905, the image processing apparatus 101 executes a job by using the processed output data received from the image processing server 105. Then, the processing of the flowchart is terminated.

According to the present exemplary embodiment, each image processing apparatus can reduce the load for image file transmission without having the file management table 801.

In a third exemplary embodiment, the image processing apparatus 101 and the image processing server 105 share a management table, and perform synchronizing processing at any timing to achieve the present invention.

Figure 13:
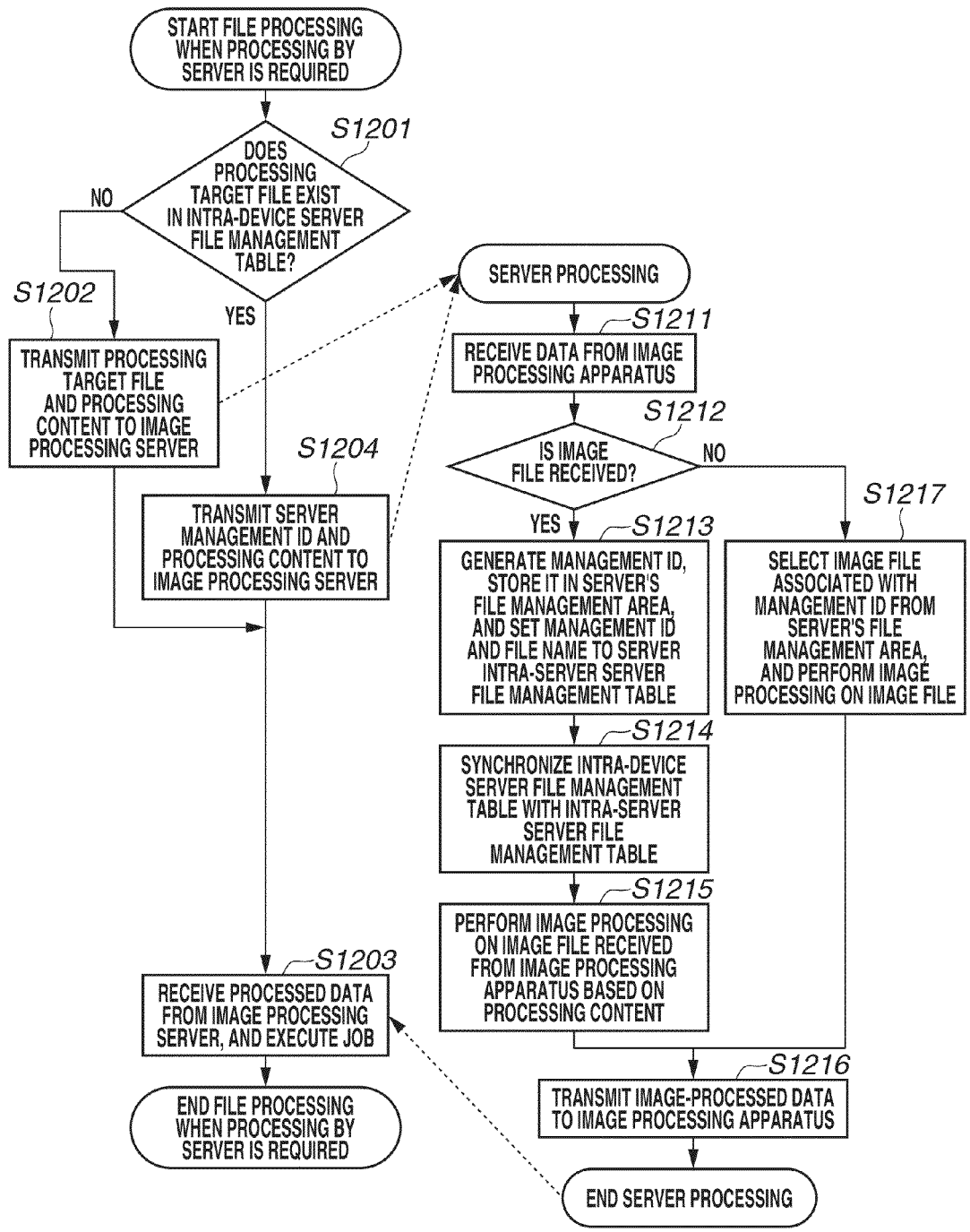
FIG. 13 is a flowchart illustrating a data processing method of the image processing system.

FIG. 13 is a flowchart illustrating a data processing method of an image processing system according to the present exemplary embodiment. In the present exemplary embodiment, the image processing apparatus 101 performs synchronizing processing on the intra-device server file management table 801 and the server file management table 1001 managed in the server to determine whether the target file exists in the file management area in the HDD 213 of the image processing server 105. In step S1201, the image processing apparatus 101 determines whether the target file exists in the intra-device server file management table 801.

When the image processing apparatus 101 determines that the target file does not exist in the intra-device server file management table 801 (NO in step S1201), the processing proceeds to step S1202. In step S1202, the image processing apparatus 101 transmits the processing target file and the processing content to the image processing server 105.

In step S1211, the image processing server 105 receives data from the image processing apparatus 101. In step S1212, the image processing server 105 determines the type of the data received together with the processing content. When the processing target image file is determined to be received (YES in step S1212), the processing proceeds to step S1213. In step S1213, the image processing server 105 generates a server management ID, associates the server management ID with the target image file, and stores the server management ID and the target image file in the file management area in the HDD 213. In step S1213, the image processing server 105 sets the management ID and the file name to the server file management table 1001 of the image processing server 105.

In step S1214, the image processing server 105 performs synchronizing processing on the server file management table 1001 of the image processing server 105 and the intra-device server file management table 801 of the image processing apparatus 101. In the synchronizing processing, the file name 1003 in the server file management table 1001 of the image processing server 105, and the server management ID 1002 associated with the file name 1003 are reflected to the intra-device server file management table 801. Thus, the server file management tables 801 and 1001 can be synchronized with each other in a state where the same file is set to respective tables.

Although, in the present exemplary embodiment, the synchronizing processing is performed at a timing when the server file management table 1001 of the image processing server 105 is updated, the timing of the synchronizing processing is not limited thereto. For example, the synchronizing processing is performed when there is a change as a result of polling at certain intervals, or performed at a timing when the user logs on or logs off.

In step S1215, the image processing server 105 performs image processing on the target file received from the image processing apparatus 101, based on the processing content received at the same timing as the target file. In step S1216, the image processing server 105 transmits the image-processed output data to the image processing apparatus 101.

In step S1203, the image processing apparatus 101 executes a job by using the output data received from the image processing server 105. Then, the processing of the flowchart is terminated.

On the other hand, when the image processing apparatus 101 determines that the target file exists in the intra-device server file management table 801 (YES in step S1201), the processing proceeds to step S1204. In step S1204, the image processing apparatus 101 transmits the server management ID 802 and the processing content to the image processing server 105.

In step S1211, the image processing server 105 receives data from the image processing apparatus 101. In step S1212, the image processing server 105 determines the type of the data received together with the processing content. When the type of the data received is determined to be the server management ID (NO in step S1212), the processing proceeds to step S1217. In step S1217, the image processing server 105 selects the image file associated with the server management ID from the file management area in the HDD 213, and performs image processing. In step S1216, the image processing server 105 transmits the image-processed output data to the image processing apparatus 101. In step S1203, the image processing apparatus 101 receives the printable output data transmitted from the image processing server 105 (in response to the data transmitted in step S1204), and executes a job. Then, the processing of the flowchart is terminated.

In a fourth exemplary embodiment, an image processed by the image processing server 105 is stored in the server-converted data storage area in the HDD 313 of the image processing apparatus 101, and, in the case of data with common processing content, the data in the server-converted data storage area is used to achieve the present exemplary embodiment.

Figure 14:
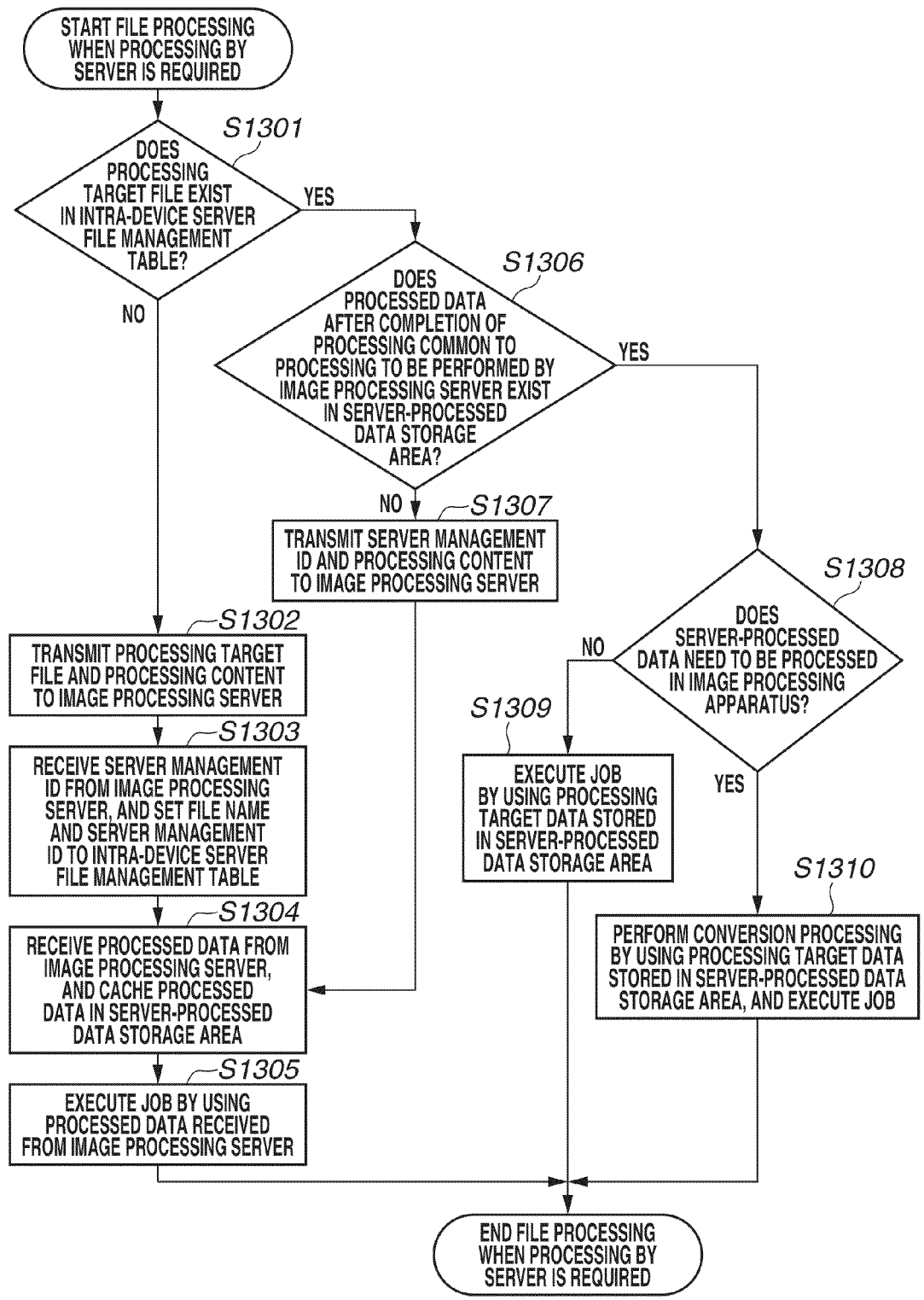
FIG. 14 is a flowchart illustrating a data processing method of the image processing apparatus.

FIG. 14 is a flowchart illustrating a data processing method of the image processing apparatus according to the present exemplary embodiment. The image processing apparatus 101 performs the example processing in a case where a server-converted data storage area exists in the HDD 313 of the image processing apparatus 101. The processing flow by the image processing server 105 according to the present exemplary embodiment corresponds to the processing illustrated in FIG. 7. The processing illustrated in FIG. 14 will be described below referring to FIG. 7. In step S1301, the image processing apparatus 101 determines whether the target file exists in the intra-device server file management table 801. When the image processing apparatus 101 determines that the target file does not exist in the intra-device server file management table 801 (NO in step S1301), the processing proceeds to step S1302. In step S1302, the image processing apparatus 101 transmits the target file and the processing content to the image processing server 105.

In step S701, the image processing server 105 receives the data from the image processing apparatus 101. In step S702, the image processing server 105 determines the type of the data received together with the processing content. When an image file is determined to be received (YES in step S702), the processing proceeds to step S703. In step S703, the image processing server 105 generates a server management ID, and stores the server management ID and the target image file in the file management area in the HDD 213. In step S704, the image processing server 105 transmits the server management ID to the image processing apparatus 101.

In step S1303, the image processing apparatus 101 receives the server management ID from the image processing server 105, and describes the file name 803 and the server management ID 802 in the intra-device server file management table 801. In step S705, the image processing server 105 performs image processing on the image file received from the image processing apparatus 101, based on the processing content received at the same timing as the image file. In step S706, the image processing server 105 transmits the image-processed output data to the image processing apparatus 101.

In step S1304, the image processing apparatus 101 receives the processed output data, and stores the data in the server-converted data storage area in the HDD 313 of the image processing apparatus 101. In step S1305, the image processing apparatus 101 executes a job by using the processed output data received from the image processing server 105.

When the image processing apparatus 101 determines that the processing target file exists in the intra-device server file management table 801 (YES in step S1301), the processing proceeds to step S1306. In step S1306, the image processing apparatus 101 determines whether the processed output data, on which the image processing server 105 has already performed processing common to processing to be performed by the image processing server 105, exists in the server-converted data storage area in the HDD 313. This step is intended to determine whether the data having undergone conversion processing by the image processing server 105 is reusable for a new job. When the data is determined to be not reusable (NO in step S1306), the processing proceeds to step S1307. In step S1307, the image processing apparatus 101 searches for the server management ID 802 associated with the target file name 803 in the intra-device server file management table 801, and transmits the server management ID 802 and the processing content to the image processing server 105.

In step S701, the image processing server 105 receives the data from the image processing apparatus 101, and determines the type of the data received together with the processing content. When the type of the received data is determined to be the server management ID (NO in step S702), the processing proceeds to step S707. In step S707, the image processing server 105 selects the image file associated with the server management ID from the file management area in the HDD 213, and performs image processing on the image file. In step S706, the image processing server 105 transmits the image-processed output data to the image processing apparatus 101. In step S1304, the image processing apparatus 101 receives the output data, and stores the output data in the server-converted data storage area in the HDD 313 of the image processing apparatus 101. In step S1305, the image processing apparatus 101 executes a job by using the processed output data received from the image processing server 105. Then, the processing of the flowchart is terminated.

When the image processing apparatus 101 determines that the processed data having undergone processing common to processing to be executed by the image processing server 105 exists in the server-converted data storage area in the HDD 313 of the image processing apparatus 101 (YES in step S1306), the processing proceeds to step S1308. In step S1308, the image processing apparatus 101 determines whether the server-processed output data needs to be processed in the image processing apparatus 101. The processing in the image processing apparatus 101 is intended to be processing which can be performed on the server-processed data only by the image processing apparatus 101, such as color conversion and double-sided printing.

When the image processing apparatus 101 determines that the server-processed output data does not need to be processed in the image processing apparatus 101 (NO in step S1308), the processing proceeds to step S1309. In step S1309, the image processing apparatus 101 executes a job by using the target data stored in the server-converted data storage area in the HDD 313. Then, the processing exits this flowchart.

On the other hand, when the image processing apparatus 101 determines that the server-processed output data needs to be processed in the image processing apparatus 101 (YES in step S1308), the processing proceeds to step S1310. In step S1310, the image processing apparatus 101 performs conversion processing on the processing target data stored in the server-converted data storage area in the HDD 313, and executes a job. Then, the processing of the flowchart is terminated.

A timing when a file stored in the file management area in the HDD 213 of the image processing server 105 is deleted, is described.

The first timing is a timing when a series of jobs is completed. For example, when the user regularly performs image processing by using the image processing apparatus 101, the user first presses the PREVIEW button 503 on the file list display unit 501 of the operation unit 303, and then confirms the PREVIEW screen 1101.

Figure 15:
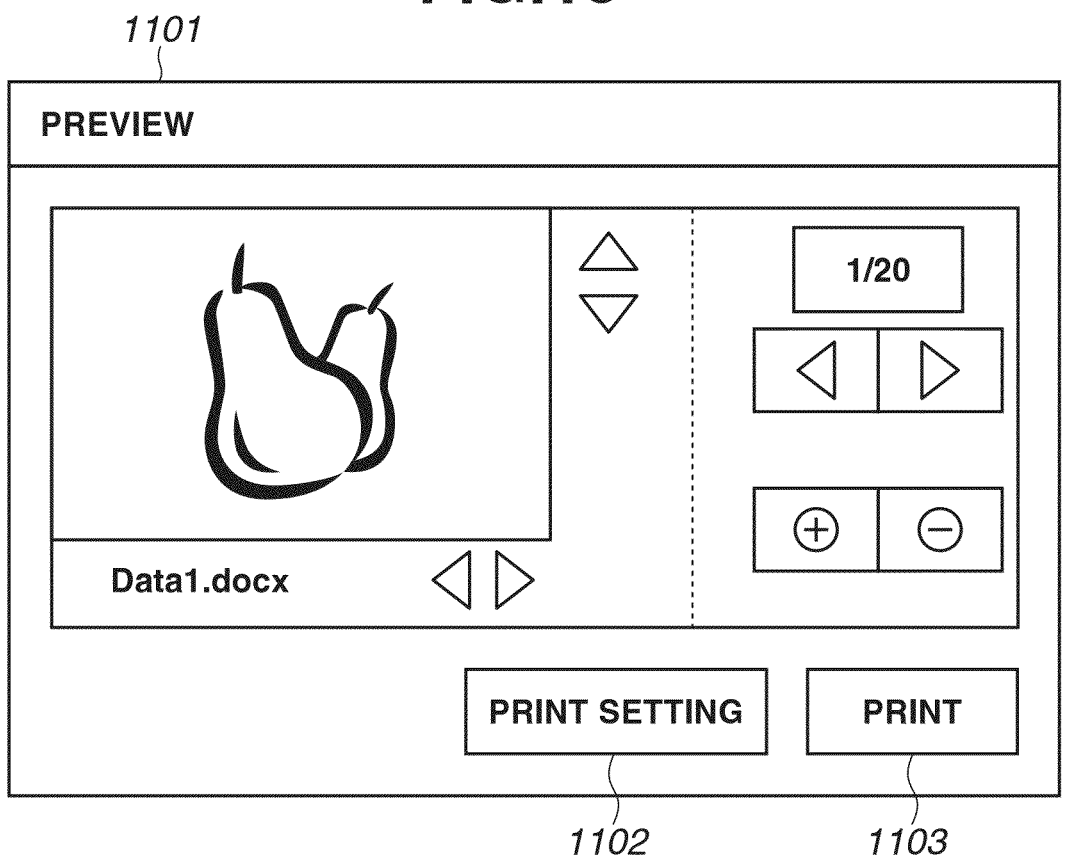
FIG. 15 illustrates an example UI screen displayed on the operation unit.

FIG. 15 illustrates an example UI screen displayed on the operation unit 303 illustrated in FIG. 3. This example preview screen is displayed on the operation unit 303 by the image processing apparatus 101. When processing by the image processing server 105 is required to display this screen, the image processing apparatus 101 displays on the preview screen 1101 a preview image based on the output data generated by the image processing server 105.

The user checks the preview, and then presses the PRINT button 1103 to perform print processing. In this case, the user may press a PRINT SETTING button 1102 to shift to a detailed print setting screen. During a series of processing for performing printing from such a preview, the image processing server 105 holds the image file and, at a timing when the print job is completed, deletes the file stored in the file management area in the HDD 213.

The second timing is a timing when the user logs in or logs off. While the user is logging in and performing operation, the image processing server 105 holds the image file based on the determination that the user may possibly reuse the data. When the user logs off, the image processing server 105 determines that the user completes operation on the image processing apparatus 101, and deletes the image file from the file management area in the HDD 213.

The third timing is a timing when power of the image processing apparatus 101 is turned OFF. The fourth timing is a timing when an arbitrary time period has elapsed. For example, the image processing server 105 holds the image file for an arbitrary period (one day, one week, one month, one year, etc.) specified on the device setting screen of the image processing apparatus 101 by a service personnel.

The present invention is not limited to the above-described exemplary embodiments, and can be modified in various ways (including organic combinations of these exemplary embodiments) without departing from the spirit and scope thereof. These modifications are not excluded from the scope of the present invention.

According to the above-described exemplary embodiments, in a case where a target file which cannot be print-processed by an image processing apparatus itself has been processed by an information processing apparatus, identification information for identifying the target file, instead of the target file, and setting information are transmitted to an image processing server. Thus, print information to be subjected to print processing can be acquired.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-222290 filed Oct. 25, 2013, which is hereby incorporated by reference herein in its entirety.

What is claimed is:

1. An image processing apparatus capable of communicating with an information processing apparatus, the image processing apparatus comprising:
    at least one processor;
    an acquisition unit configured to acquire a processing target file to be printed;
    a first determination unit configured to determine whether the acquired processing target file is processable by the image processing apparatus;
    a second determination unit configured to determine whether the processing target file is stored in the information processing apparatus which processes the processing target file received from the image processing apparatus; and
    a transmission control unit configured to transmit information to the information processing apparatus,
    wherein, in a first case where the first determination unit has determined that the processing target file is not processable by the image processing apparatus, and the second determination unit determines that the processing target file is not stored in the information processing apparatus, the transmission control unit transmits the processing target file and processing information to the information processing apparatus, and
    wherein, in a second case where the first determination unit has determined that the processing target file is not processable by the image processing apparatus, and the second determination unit has determined that the processing target file is stored in the information processing apparatus, the transmission control unit transmits an identification information of the processing target file and the processing information to the information processing apparatus,
    wherein, in the first case where the first determination unit has determined that the processing target file is not processable by the image processing apparatus, and the second determination unit determines that the processing target file is not stored in the information processing apparatus, the identification information of the processing target file is generated and the processing target file transmitted from the image processing apparatus and the identification information of the processing target file are stored in the information processing apparatus, and
    wherein at least one of the acquisition unit, the first determination unit, the second determination unit, and the transmission control unit are implemented by the at least one processor.

2. The image processing apparatus according to claim 1, further comprising a processing unit configured to perform processing on the processing target file in a third case where the first determination unit has determined that the processing target file is processable by the image processing apparatus.

3. The image processing apparatus according to claim 1, further comprising a storage unit configured to store the identification information to identify the processing target file stored in the information processing apparatus,
    wherein, the second determination unit determines whether the processing target file is stored in the information processing apparatus by referring to the identification information stored in the storage unit.

4. The image processing apparatus according to claim 3, further comprising a receiving unit implemented by the at least one processor and configured to receive the identification information from the information processing apparatus.

5. The image processing apparatus according to claim 1, further comprising a receiving unit implemented by the at least one processor and configured to receive, from the information processing apparatus, the processing target file processed based on the processing information.

6. A method to control an image processing apparatus capable of communicating with an information processing apparatus, the method comprising:
   acquiring a processing target file to be printed;
   determining, as a first determination, whether the acquired processing target file is processable by the image processing apparatus;
   determining, as a second determination, whether the processing target file is stored in the information processing apparatus which processes the processing target file received from the image processing apparatus; and
   transmitting information to the information processing apparatus,
   wherein, in a first case where the first determination has determined that the processing target file is not processable by the image processing apparatus, and the second determination determines that the processing target file is not stored in the information processing apparatus, transmitting includes transmitting the processing target file and processing information to the information processing apparatus,
   wherein, in a second case where the first determination has determined that the processing target file is not processable by the image processing apparatus, and the second determining determination has determined that the processing target file is stored in the information processing apparatus, transmitting includes transmitting an identification information of the processing target file and the processing information to the information processing apparatus, and
   wherein, in the first case where the first determination has determined that the processing target file is not processable by the image processing apparatus, and the second determination determines that the processing target file is not stored in the information processing apparatus, the identification information of the processing target file is generated and the processing target file transmitted from the image processing apparatus and the identification information of the processing target file are stored in the information processing apparatus.

7. The method according to claim 6, further comprising performing processing on the processing target file in a third case where the first determination has determined that the processing target file is processable by the image processing apparatus, on the processing target file.

8. The method according to claim 6, further comprising storing the identification information to identify the processing target file stored in the information processing apparatus,
   wherein, the second determination determines whether the processing target file is stored in the information processing apparatus by referring to the stored identification information.

9. The method according to claim 8, further comprising receiving the identification information from the information processing apparatus.

10. The method according to claim 6, further comprising receiving, from the information processing apparatus, the processing target file processed based on the processing information.

11. A non-transitory computer readable storage medium storing a program to cause a computer to perform a method to control an image processing apparatus capable of communicating with an information processing apparatus, the method comprising:
   acquiring a processing target file to be printed;
   determining, as a first determination, whether the acquired processing target file is processable by the image processing apparatus;
   determining, as a second determination, whether the processing target file is stored in the information processing apparatus which processes the processing target file received from the image processing apparatus; and
   transmitting information to the information processing apparatus,
   wherein, in a first case where the first determination has determined that the processing target file is not processable by the image processing apparatus, and the second determination determines that the processing target file is not stored in the information processing apparatus, transmitting includes transmitting the processing target file and processing information to the information processing apparatus,
   wherein, in a second case where the first determination has determined that the processing target file is not processable by the image processing apparatus, and the second determination has determined that the processing target file is stored in the information processing apparatus, transmitting includes transmitting an identification information of the processing target file and the processing information to the information processing apparatus,
   wherein, in the first case where the first determination has determined that the processing target file is not processable by the image processing apparatus, and the second determination determines that the processing target file is not stored in the information processing apparatus, the identification information of the processing target file is generated and the processing target file transmitted from the image processing apparatus and the identification information of the processing target file are stored in the information processing apparatus.

12. The non-transitory computer readable storage medium according to claim 11, the method further comprising performing processing on the processing target file in the first case or in the second case where the first determination has determined that the processing target file is processable by the image processing apparatus.

13. The non-transitory computer readable storage medium according to claim 11, the method further comprising storing the identification information to identify the processing target file stored in the information processing apparatus,
   wherein, the second determination determines whether the processing target file is stored in the information processing apparatus by referring to the stored identification information.

14. The non-transitory computer readable storage medium according to claim 13, the method further comprising receiving the identification information from the information processing apparatus.

15. The non-transitory computer readable storage medium according to claim 11, the method further comprising receiving, from the information processing apparatus, the processing target file processed based on the processing information.

* * * * *